United States Patent
Garland

(10) Patent No.: US 12,274,246 B2
(45) Date of Patent: Apr. 15, 2025

(54) INSULATED AND VENTILATED SHELLFISH STORAGE

(71) Applicant: Clearwater Seafood Limited Partnership, Bedford (CA)

(72) Inventor: John J. Garland, Halifax (CA)

(73) Assignee: Clearwater Seafoods Limited Partnership, Bedford (CA)

( * ) Notice: Subject to any disclaimer, the term of this patent is extended or adjusted under 35 U.S.C. 154(b) by 531 days.

(21) Appl. No.: 15/734,632

(22) PCT Filed: May 9, 2019

(86) PCT No.: PCT/CA2019/050618
§ 371 (c)(1),
(2) Date: Dec. 3, 2020

(87) PCT Pub. No.: WO2019/237180
PCT Pub. Date: Dec. 19, 2019

(65) Prior Publication Data
US 2021/0227806 A1     Jul. 29, 2021

Related U.S. Application Data

(60) Provisional application No. 62/685,356, filed on Jun. 15, 2018.

(51) Int. Cl.
*A01K 63/02* (2006.01)
*A01K 63/06* (2006.01)

(52) U.S. Cl.
CPC ............ *A01K 63/02* (2013.01); *A01K 63/065* (2013.01)

(58) Field of Classification Search
CPC ...... A01K 63/02; A01K 63/065; A01K 63/04; A01K 97/20; A01K 61/59
(Continued)

(56) References Cited

U.S. PATENT DOCUMENTS

| 485,422 | A | * | 11/1892 | McGray |
| 4,334,500 | A | * | 6/1982 | Ziller ................... A01K 1/0245 119/419 |

(Continued)

FOREIGN PATENT DOCUMENTS

| CA | 2 893 010 A1 |   | 6/2014 |  |
| CA | 2961426 | * | 9/2015 | ............. A01K 63/04 |

(Continued)

OTHER PUBLICATIONS

International Search Report and Written Opinion mailed Aug. 12, 2019 for International Application No. PCT/CA2019/050618 filed May 9, 2019 for Clearwater Seafoods Limited Partnership, 10 pages.

(Continued)

*Primary Examiner* — Andrea M Valenti
(74) *Attorney, Agent, or Firm* — Cesari and McKenna, LLP

(57) ABSTRACT

Various embodiments relating to insulated and ventilated shellfish storage, for transport for example, are disclosed. An insulated container includes a bottom and walls defining an interior space to accommodate live shellfish. A $CO_2$ handling feature to handle $CO_2$ that is released into the interior space by the live shellfish is also provided. The $CO_2$ handling feature could include, for example, a ventilated wall having a vent at a location toward the bottom of the insulated container, $CO_2$ scrubbing, a $CO_2$ accumulation structure to accumulate $CO_2$ below the live shellfish, and/or a ventilated wall substantially parallel to the bottom to divide the interior space into an animal section to accommodate the live shellfish and a $CO_2$ accumulation section to accumulate $CO_2$. Embodiments are based on a discovery by the inventor that $CO_2$ is a limiting factor for storage time of crustaceans out of water.

10 Claims, 9 Drawing Sheets

(58) Field of Classification Search
USPC .................................. 119/214, 200, 201, 204
See application file for complete search history.

(56) References Cited

U.S. PATENT DOCUMENTS

| | | | | |
|---|---|---|---|---|
| 4,427,548 | A | * | 1/1984 | Quick, Jr. ................ C02F 3/10 210/903 |
| 4,455,966 | A | * | 6/1984 | Knowles ................ A01K 63/02 119/203 |
| 4,907,536 | A | * | 3/1990 | Chrisler ................ A01K 1/0245 119/419 |
| 5,042,260 | A | * | 8/1991 | George, Sr. ................ F25D 3/08 62/457.2 |
| 5,050,535 | A | * | 9/1991 | McKellar ................ A01K 63/02 119/203 |
| 5,218,923 | A | * | 6/1993 | LaRosa ................ B65D 81/022 119/201 |
| 5,555,845 | A | | 9/1996 | Flynn |
| 5,632,405 | A | * | 5/1997 | McMath ................ A01K 63/02 220/676 |
| 6,041,931 | A | * | 3/2000 | Jacques ................ F25D 3/08 206/508 |
| 2004/0031705 | A1 | | 2/2004 | Detemple et al. |

FOREIGN PATENT DOCUMENTS

| | | | | |
|---|---|---|---|---|
| CN | 101850875 | | 10/2010 | |
| CN | 201801065 | * | 4/2011 | ............... A23B 7/00 |
| CN | 103340239 | | 10/2013 | |
| EP | 3409615 | * | 12/2018 | ............. B65D 81/26 |
| EP | 3409615 A1 | * | 12/2018 | ........... B65D 43/162 |
| GB | 2287454 A | * | 9/1995 | ............. A01K 63/02 |
| JP | 09-47189 A | | 2/1997 | |
| JP | 2000085850 | * | 3/2000 | ............. B65D 81/26 |
| KR | 20150003349 | * | 9/2015 | ............. A01K 63/02 |
| WO | 2014094159 A1 | | 6/2014 | |

OTHER PUBLICATIONS

Extended European Search Report issued on May 19, 2022 in respect of European Patent Application No. 19820599.9 (6 pages).

* cited by examiner

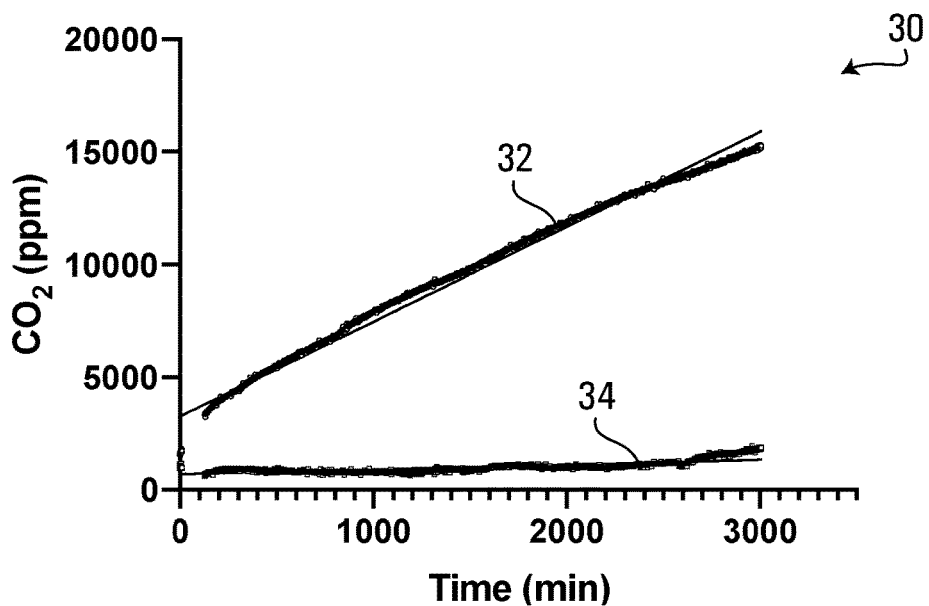
FIG. 3
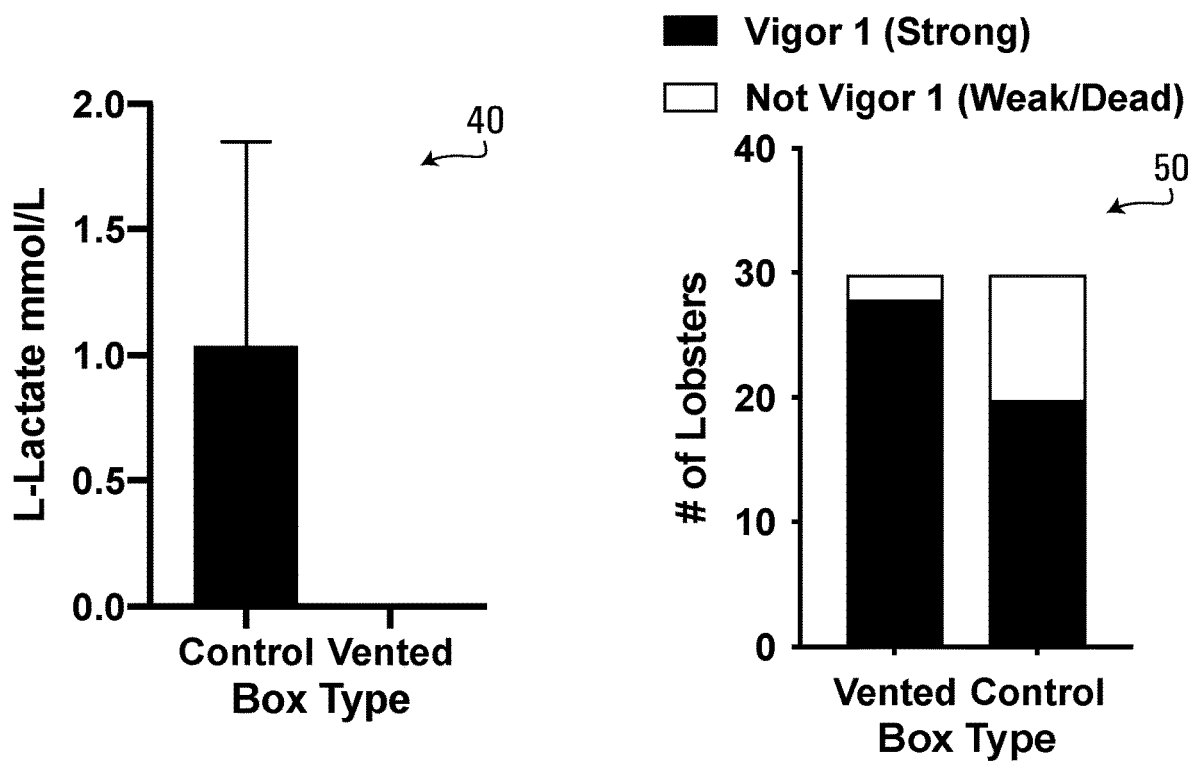
FIG. 4
FIG. 5

INSULATED AND VENTILATED SHELLFISH STORAGE

CROSS-REFERENCE TO RELATED APPLICATION

The present application is the National Stage of International Application No. PCT/CA2019/050618, filed on May 9, 2019, which claims priority from U.S. Provisional Patent Application No. 62/685,356 filed Jun. 15, 2018, the entire contents of both of which are incorporated herein by reference.

FIELD OF THE INVENTION

This invention relates generally to shellfish storage and, in particular, to dry (out of water), insulated and ventilated storage of shellfish, such as crabs lobsters, other crustaceans, and/or bivalves, without water immersion or water flow.

BACKGROUND

Live lobsters have the ability to live out of water for periods of time up to a practical maximum of approximately 48 to 60 hours, and other shellfish such as crabs have similar out of water survival times. This allows for live shellfish to be successfully shipped to most markets around the world using airfreight. Maintaining animal health and reducing mortality during dry storage without immersion in water or at least water flow, during storage for transport for example, remains a challenge.

SUMMARY

According to an aspect of the present disclosure, an insulated container includes a bottom and a plurality of walls defining an interior space to accommodate live shellfish, the plurality of walls including a ventilated wall having a vent at a location toward the bottom.

In some embodiments, the plurality of walls includes end walls and side walls, and the ventilated wall includes one of the end walls.

In some embodiments, the plurality of walls includes end walls and side walls, and the ventilated wall includes one of the side walls.

In some embodiments, the ventilated wall has a plurality of vents.

In some embodiments, each wall of the plurality of walls has a respective vent.

In some embodiments, the insulated container further includes a gas permeable and water-resistant structure, adjacent to the vent, to form a water-resistant seal over the vent.

In some embodiments, the location of the vent is at or below an expected height of gills of the live shellfish relative to the bottom.

In some embodiments, the expected height of the gills of the live shellfish is based on the live shellfish being oriented in a vertical orientation substantially perpendicular to the bottom.

In some embodiments, the expected height of the gills of the live shellfish is based on the live shellfish being oriented in a horizontal orientation substantially parallel to the bottom.

In some embodiments, the location of the vent is at or above an expected height of a liquid level inside the insulated container relative to the bottom.

In some embodiments, the location of the vent is at a height on the ventilated wall relative to an interior surface of the bottom.

In some embodiments, the location of the vent is at a height on the ventilated wall relative to an exterior surface of the bottom.

In some embodiments, the bottom includes a channel provided therein.

In some embodiments, the vent overlaps, at least partially, with the channel.

In some embodiments, the insulated container further includes a divider to divide the interior space into a plurality of cells to accommodate the live shellfish in a vertical orientation substantially perpendicular to the bottom.

In some embodiments, the divider includes fluid communication channels formed therein to enable fluid communication between adjacent cells of the plurality of cells.

In some embodiments, the insulated container further includes a perforated top insert, carried at or below a top edge of the insulated container by the divider, to distribute fluid to the cells.

In some embodiments, the insulated container further includes a bottom insert.

In some embodiments, the bottom insert is configured to displace the live shellfish from the bottom to accommodate fluid below the live shellfish.

In some embodiments, the bottom insert is configured to direct gas to the vent.

In some embodiment, the insulated container further includes a lid to close the interior space.

Another aspect provides an insulated container including: a bottom and a plurality of walls defining an interior space of an insulated container to accommodate live shellfish; and a $CO_2$ handling feature to handle $CO_2$ that is released into the interior space by the live shellfish.

In some embodiments, the $CO_2$ handling feature includes $CO_2$ scrubbing.

In some embodiments, $CO_2$ handling feature includes a vent in a ventilated wall of the plurality of walls, the vent being at a location toward the bottom.

In some embodiments, the $CO_2$ handling feature includes a $CO_2$ accumulation structure to accumulate $CO_2$ below the live shellfish.

In some embodiments, the bottom includes the $CO_2$ accumulation structure.

In some embodiments, the insulated container includes a bottom insert, and the bottom insert includes the $CO_2$ accumulation structure.

In some embodiments, the $CO_2$ accumulation structure includes one or more channels.

In some embodiments, the $CO_2$ handling feature includes a ventilated wall, substantially parallel to the bottom, to divide the interior space into an animal section to accommodate the live shellfish and a $CO_2$ accumulation section to accumulate $CO_2$ that is released into the interior space by the live shellfish.

In some embodiments, the $CO_2$ accumulation section includes a plenum or cavity into which the ventilated wall ventilates the animal section.

A package includes: an insulated container, the insulated container including a bottom and a plurality of walls defining an interior space to accommodate live shellfish, the plurality of walls including a ventilated wall having a vent at a location toward the bottom; and the live shellfish inside the insulated container.

More generally, a package could include: an insulated container as disclosed herein; and live shellfish inside the insulated container.

Another aspect provides a ventilated transport or storage system including: a ventilated enclosure having an interior space to accommodate containers or packages; and a plurality of insulated containers or packages as disclosed herein. In some embodiments, the ventilated enclosure includes at least one of: a refrigerated container, a cargo hold, a truck trailer, and an ocean going vessel.

A method according to an aspect of the present disclosure includes: providing a container bottom and a plurality of container walls defining an interior space of an insulated container to accommodate live shellfish, where providing the plurality of walls includes providing a ventilated wall having a vent at a location toward the bottom.

In some embodiments, providing the ventilated wall includes venting an unventilated wall.

In some embodiments, the plurality of walls includes end walls and side walls, and the ventilated wall includes one of the end walls.

In some embodiments, the plurality of walls includes end walls and side walls, and the ventilated wall includes one of the side walls.

In some embodiments, the ventilated wall has a plurality of vents.

In some embodiments, each wall of the plurality of walls has a respective vent.

In some embodiments, the method further includes providing a gas permeable and water-resistant structure, adjacent to the vent, to form a water-resistant seal over the vent.

In some embodiments, the location is at or below an expected height of gills of the live shellfish relative to the bottom.

In some embodiments, the expected height is based on the live shellfish being oriented in a vertical orientation substantially perpendicular to the bottom.

In some embodiments, the expected height is based on the live shellfish being oriented in a horizontal orientation substantially parallel to the bottom.

In some embodiments, the location is at or above an expected height of a liquid level inside the insulated container relative to the bottom.

In some embodiments, the location is at a height on the ventilated wall relative to an interior surface of the bottom.

In some embodiments, the location is at a height on the ventilated wall relative to an exterior surface of the bottom.

In some embodiments, the method further includes providing a channel in the bottom.

In some embodiments, the vent overlaps, at least partially, with the channel.

In some embodiments, the method further includes providing a divider to divide the interior space into a plurality of cells to accommodate the live shellfish in a vertical orientation substantially perpendicular to the bottom.

In some embodiments, the divider includes fluid communication channels formed therein to enable fluid communication between adjacent cells of the plurality of cells.

In some embodiments, the method further includes providing a perforated top insert, to be carried at or below a top edge of the insulated container by the divider, to distribute fluid to the cells.

In some embodiments, the method further includes providing a bottom insert.

In some embodiments, the bottom insert is configured to displace the live shellfish from the bottom to accommodate fluid below the live shellfish.

In some embodiments, the bottom insert is configured to direct gas to the vent.

In some embodiments, the method further includes providing a lid to close the interior space.

Another method includes: providing a bottom and a plurality of walls defining an interior space of an insulated container to accommodate live shellfish; and providing a $CO_2$ handling feature to handle $CO_2$ that is released into the interior space by the live shellfish.

In some embodiments, providing a $CO_2$ handling feature includes providing $CO_2$ scrubbing.

In some embodiments, providing a $CO_2$ handling feature includes providing a vent in a ventilated wall of the plurality of walls, the vent being at a location toward the bottom.

In some embodiments, providing a $CO_2$ handling feature includes: providing a $CO_2$ accumulation structure to accumulate $CO_2$ below the live shellfish.

In some embodiments, the bottom includes the $CO_2$ accumulation structure.

In some embodiments, providing a $CO_2$ accumulation structure includes: providing a bottom insert including the $CO_2$ accumulation structure.

In some embodiments, the $CO_2$ accumulation structure includes one or more channels.

In some embodiments, providing a $CO_2$ handling feature includes: providing a ventilated wall, substantially parallel to the bottom, to divide the interior space into an animal section to accommodate the live shellfish and a $CO_2$ accumulation section to accumulate $CO_2$ that is released into the interior space by the live shellfish.

In some embodiments, the $CO_2$ accumulation section includes a plenum or cavity into which the ventilated wall ventilates the animal section.

A further method includes: providing the insulated container as disclosed herein.

Yet another method includes: providing an insulated container including a bottom and a plurality of container walls defining an interior space to accommodate live shellfish, the plurality of walls including a ventilated wall having a vent at a location toward the bottom; packing live shellfish into the insulated container.

Also disclosed is a method including: providing a bottom and a plurality of walls defining an interior space of an insulated container to accommodate live shellfish; providing a $CO_2$ handling feature to handle $CO_2$ that is released into the interior space by the live shellfish; packing live shellfish into the insulated container.

According to another aspect, a method includes: providing an insulated container as disclosed herein; packing live shellfish into the insulated container.

There is also provided a method including: providing a ventilated enclosure having an interior space to accommodate containers; loading the ventilated enclosure with a plurality of insulated containers. In an embodiment, each insulated container includes a bottom and a plurality of walls defining an interior space to accommodate live shellfish, the plurality of walls including a ventilated wall having a vent at a location toward the bottom. In another embodiment, each insulated container includes a bottom and a plurality of walls defining an interior space of the insulated container to accommodate live shellfish and a $CO_2$ handling feature to handle $CO_2$ that is released into the interior space by the live shellfish. More generally, each insulated container could be a container as disclosed herein. In some embodiments, each insulated container further includes the live shellfish packed into the interior space.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIG. 3 is a plot illustrating $CO_2$ concentration as a function of time in a vented shipping box and a control shipping box during *Homarus americanus* emersed trials.

FIG. 4 is a plot illustrating lactate concentrations in the blood of *Homarus americanus* following emersed trials with a vented shipping box and a control shipping box.

FIG. 5 is a plot illustrating the vigor of *Homarus americanus* following emersed trials with a vented shipping box and a control shipping box.

DETAILED DESCRIPTION

Figure 1:
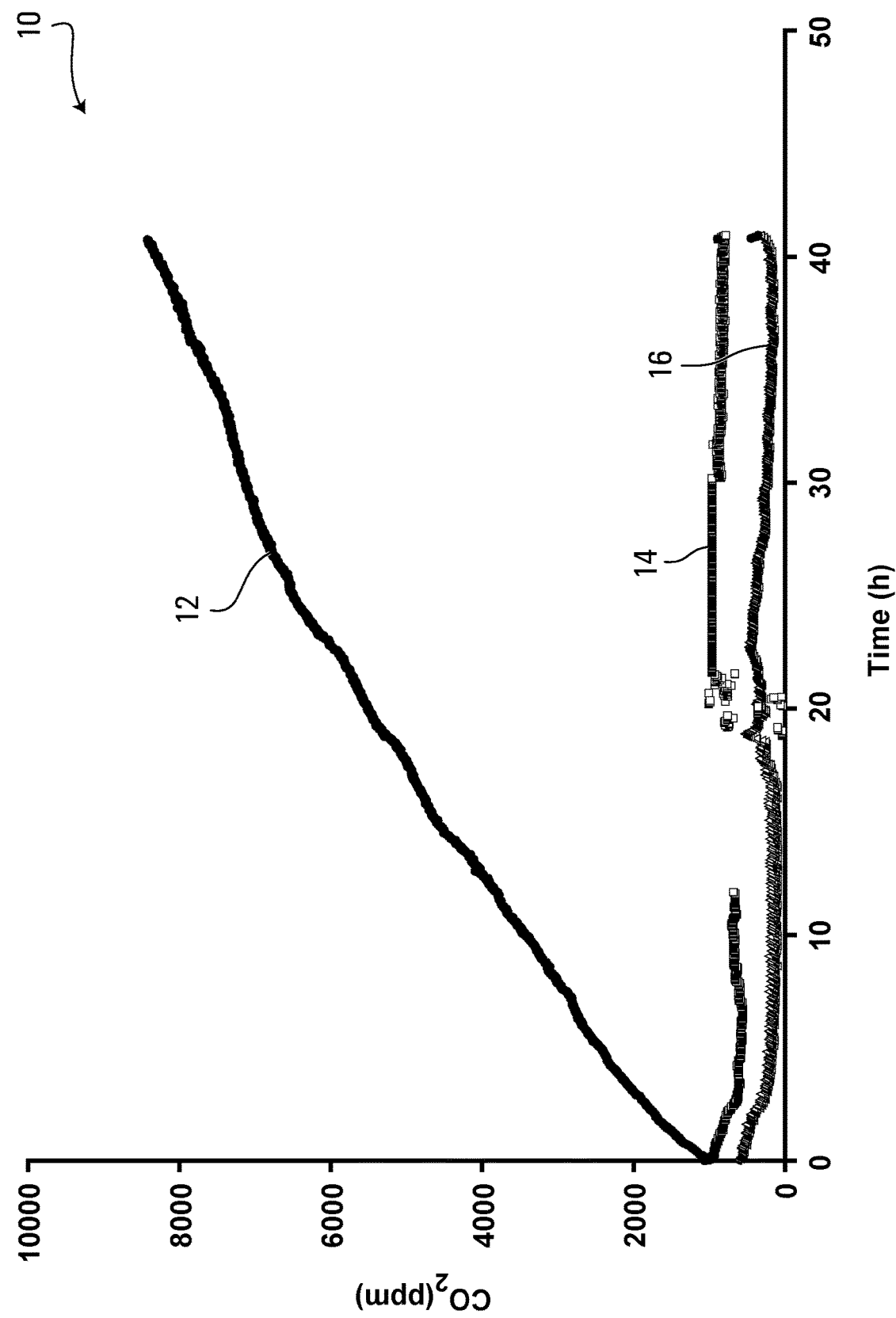
FIG. 1 is a plot illustrating $CO_2$ concentration as a function of time in a vented shipping box and a control shipping box during *Cancer borealis* emersed trials.

Embodiments of the present disclosure are described herein primarily in the context of crabs and lobsters. It should be appreciated that these are example embodiments only, and that the present disclosure could be applied more generally to shellfish, such as other crustaceans and/or bivalves, for instance.

One type of airfreight shipping box is designed to keep crabs or lobsters cool and humid during consignment. Lobsters, for example, are poikilotherms (cold blooded) and their metabolic rate is directly related to their body temperature. To keep their metabolism low during air shipment to customers, gel ice packs are used in the shipping boxes and these generally maintain lobsters just above freezing and below an upper temperature limit. For the lobster *Homarus americanus*, the upper limit is typically 5° C. Similar shipping boxes and cooling methods are used for crabs and other species of lobsters as well.

Conventionally, shipping boxes are designed with a focus on insulating the interior of the boxes to maintain relatively low temperatures and high humidity. Low temperatures could be maintained by, for example, sealing at least a bottom portion of a shipping box such that cold air falling towards the bottom of the box is trapped inside. In many cases, boxes are completely sealed to retain a cool, humid environment inside, or a box may have holes in the lid to allow oxygen in.

The concept of crustaceans consuming oxygen ($O_2$) and releasing carbon dioxide ($CO_2$) while packed out of water in a chilled, insulated box has not traditionally been considered commercially relevant. Crustacean gills are lamellae filaments that have a high surface area when they are submerged in water, allowing for effective gas exchange between the blood and external water environment. When taken out of water, the gills collapse and the lamellae clump together, which in effect significantly reduces their surface area. Some gas exchange can occur while emersed, but in the absence of water this is limited and the animals typically rely on anaerobic metabolism when oxygen demand is higher than their oxygen uptake rate. By chilling the animals in the shipping box and keeping them cool throughout the shipment time, the metabolism is kept low to reduce oxygen demand and prolong time out of water.

The present inventor had initially conducted experiments that showed there was no difference in mortality between having the traditional top holes covered or present in a shipping box, and had come to the conclusion that these top holes were not useful, and in some cases caused the internal box temperature to increase faster than a sealed box if boxes were in a warm environment. In fact, some shipping methods for crabs involve sealing crabs inside shipping boxes. For example, crabs are placed in an insulated box lined with a plastic bag, and once the crabs are packed in the bag pure oxygen is injected into the bag and the bag is tied off. Another method involves sealing a box with no bag, poking a hole in the side of the box and injecting pure oxygen, and then sealing the hole. The thought was that oxygen supply was the limiting factor for survival of crabs. Crabs seem to be more metabolically active than lobsters, so this $O_2$ injection was thought to be necessary to provide extra $O_2$ for a shipment.

During subsequent box packing trials with deep sea red crab, *Chaceon quinquendons*, the inventor began to consider gas exchange in lobsters while out of water. At that time, the inventor was under the impression that there was very little gas exchange, and tested this hypothesis by putting lobsters in an insulated bag-lined box, like crabs in a shipping method mentioned above, but injected pure $CO_2$ into the bag instead of $O_2$. Lobsters typically can survive out of water for 48 to 60 hours if kept cool in a high humidity environment. 24 hours into the trial, however, 100% of the lobsters were dead and lactic acid levels in the blood were excessively high. This led the inventor to question the hypothesis that gas exchange did not occur, and shipping boxes with holes in the top were again used despite evidence that these holes were ineffective at improving shipment success.

More recently, the inventor has conducted studies on optimising out of water shipping of live crab *Cancer pagurus*. In considering questions about whether shipping boxes should have holes in the top of the box, oxygen in the box, etc., the inventor decided to do some trial work to observe $CO_2$ production rates in a shipping box and determine the maximum density of crabs and crab temperature for successful shipments. From other earlier trials related to lobster storage, the inventor recalled that $CO_2$ is heavier than air, and therefore for these current trials a $CO_2$ sensor was placed in the bottom of shipping boxes. These trials were conducted on *Cancer borealis*, a similar crab to *C. pagurus*. Both a box with top lid holes and a box without top lid holes were included in the trials.

There was no difference in $CO_2$ accumulation rate between the boxes with and without the top lid holes. However, the actual amount of $CO_2$ accumulation was surprisingly high (over 10,000 ppm in 36 hours). The inventor recognized that this elevated level of $CO_2$ could be a concern for potentially causing mortality or weakening of the crabs while they are packed in the boxes. Knowing that $CO_2$ is heavier than air, the inventor decided to puncture a line of holes in the side of the box but near the bottom of the box, just off the bottom so as to not allow dripping water from the crab's gills to leak out of the box when picked up or tipped slightly but to allow $CO_2$ produced by the crabs to escape without building up too much in the bottom of the box.

After 36 hours it was observed that $CO_2$ was being effectively removed from the bottom-vented box and accumulating in the standard, non-bottom-vented box. $CO_2$ levels in the vented box remained stable throughout the trial at a maximum of 1000 ppm, whereas the standard box accumulated $CO_2$ to a final reading of 15,000 ppm. The vigour of the crabs in the vented box was much better than the standard box, and mortality was lower as well. Lactic acid levels in the blood of the crabs in the vented box were low, and slightly elevated in the standard box. Overall, a surprising result and a very significant discovery by the inventor. The result is represented in FIG. 1.

FIG. 1 is a plot 10 illustrating $CO_2$ concentration as a function of time in a vented shipping box and a control shipping box during *Cancer borealis* emersed trials. The plot 10 illustrates *Cancer borealis* carbon dioxide accumulation in an EPS (expanded polystyrene) insulated shipping box in a 40 hour simulated air shipment trial. The "Control" box (top trace 12) had standard box top ventilation holes, the "Vented" box (middle trace 14) had perforated ventilation holes near the bottom of the box on the sides to allow for $CO_2$ to vent to atmosphere, and "Ambient" (bottom trace 16) shows the atmosphere $CO_2$ levels in the chilled trial area.

Similar trials were conducted on *C. pagurus*. The success obtained for *C. borealis* was duplicated with *C. pagurus*, with vented boxes having much better quality (stronger, less mortality and fewer weak crabs) versus non-vented boxes, so it was determined that a venting system consistent with the trials should be used in production. The trials were conducted using crab that was not deemed fit for live trade and had a poor handling and storage history prior to the start of the trials, so live trade grade crab would be expected to show improved results, with lower overall mortality in both the control and vented box treatments. The trend of improved results from vented versus control is still expected to be valid based on trials with *C. borealis* and subsequent *H. americanus* trials noted below.

Trial results for *C. pagurus* are summarized in FIG. 2, as well as Table 1 and Table 2 below:

TABLE 1

Results of Trial 1 of 40-hour *Cancer pagurus* vented air freight box trials.

| Vigour | Control | Vented |
|---|---|---|
| 1 | 25% | 66.7% |
| 2 | 25% | 11.1% |
| 3 | 43.8% | 11.1% |
| 4 | 6.2% | 11.1% |

Vigour 1 = strong, 2 = moderately strong, 3 = weak, 4 = moribund or dead.
The vented box consisted of two approximately 7 mm diameter holes, one on each end of the box, positioned approximately 2 cm from a box wall outer corner and approximately 2 cm from the outer bottom surface of the box to allow $CO_2$ to vent to the atmosphere.

TABLE 2

Results of Trial 2 of 40-hour *Cancer pagurus* vented air freight box trials.

| Vigour | Control | Vented |
|---|---|---|
| 1 | 66.6% | 83% |
| 2 | 4.2% | 0% |
| 3 | 4.2% | 8.3% |
| 4 | 25% | 8.3% |

Vigour 1 = strong, 2 = moderately strong, 3 = weak, 4 = moribund or dead.
The vented box consisted of four approximately 7 mm diameter holes, two on each end of the box, positioned approximately 2 cm from each of the box wall outer corners and approximately 2 cm from the outer bottom surface of the box to allow $CO_2$ to vent to the atmosphere.

Figure 2:
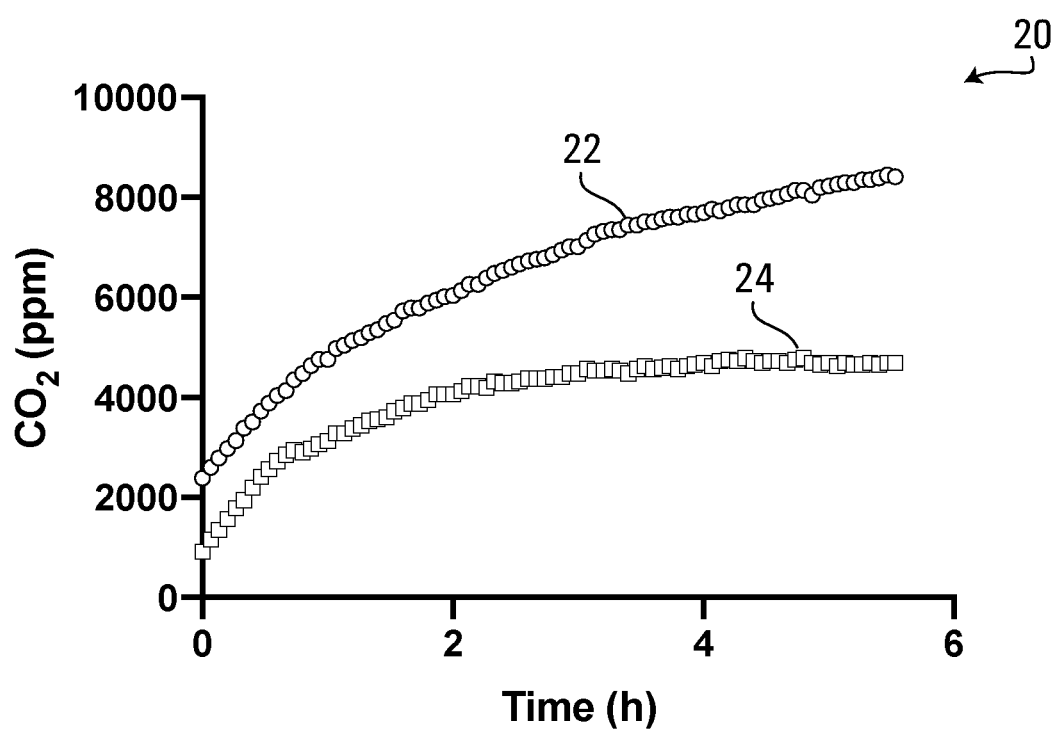
FIG. 2 is a plot illustrating $CO_2$ concentration as a function of time in a vented shipping box and a control shipping box during *Cancer pagurus* emersed trials.

FIG. 2 is a plot 20 illustrating $CO_2$ concentration as a function of time in a vented shipping box and a control shipping box during *Cancer pagurus* emersed trials. The plot 20 represents results of *Cancer pagurus* air shipment ventilation Trial 1 referenced above, with partial $CO_2$ data (first 6 hours of 40-hour trial) indicating control (unvented—upper trace 22) versus vented (2 vent holes—lower trace 24). The inventor further investigated whether ventilation could improve lobster air shipments, and the trials were again duplicated using *Homarus americanus*, comparing the current industry standard shipping box to the new, bottom-vented design. Results showed that the added ventilation improved quality maintenance in lobsters by 33% in 48-hour shipments and maintained <1000 ppm $CO_2$ in the box versus >15,000 ppm $CO_2$ in the standard shipping box. Lactate was not detected in the blood of the lobsters in the vented box but was at around 1 mmol/L in the standard shipping box, indicating that the vented box may have also been effective in preventing the lobsters from needing to switch to anaerobic metabolism. These results are summarized in FIGS. 3-5 and Table 3 below:

TABLE 3

Results of *Homarus americanus* 48-hour vented box Trial 1.

| Vigour | Control | Vented |
|---|---|---|
| 1 | 66.7% | 93.3% |
| 2, 3 & 4 | 33.3% | 6.7% |

The control box consisted of industry standard top lid ventilation holes (x2) versus the vented box which consisted of 4 ventilation holes (2 on each end) positioned as noted above for Table 2, to allow $CO_2$ to vent to the atmosphere.
Vigour 1 = strong, vigour 2, 3 & 4 = weak and dead (reject) lobsters.

FIG. 3 is a plot 30 illustrating $CO_2$ concentration as a function of time in a vented shipping box and a control shipping box during *Homarus americanus* emersed trials. The plot 30, which represents the *Homarus americanus* vented box 48 hour Trial 1 referenced above, presents internal box $CO_2$ accumulation results. The control box (upper trace 32) is the industry standard top-vented box made from EPS. The vented box (lower trace 34) consisted of 4 holes (2 on each end) positioned low to vent $CO_2$ to the atmosphere. A linear line of best fit is shown for each of the traces 32, 34.

FIG. 4 is a plot 40 illustrating lactate concentrations in the blood of *Homarus americanus* following emersed trials with a vented shipping box and a control shipping box. The plot 40 illustrates, for the *Homarus americanus* Trial 1 referenced above, hemolymph lactate (mmol/L) after 48 hours in a control box (industry standard shipping box with top lid ventilation holes) versus a vented box (4 vent holes positioned low on the box ends). Vented box lobster haemolymph had no detected accumulated haemolymph lactate.

FIG. 5 is a plot 50 illustrating the vigor of *Homarus americanus* following emersed trials with a vented shipping box and a control shipping box. The plot 50 illustrates the results presented in Table 3, for 30 lobsters in the trials.

The trial results provide evidence of a significant discovery by the inventor, that $CO_2$ appears to be the limiting factor for out of water storage such as during shipping, rather than a lack of oxygen as commonly believed.

It is expected, based on the trial results, that $CO_2$ venting as disclosed herein could improve performance during air shipment, or more generally during dry storage for shipment or otherwise, and translate into reduced mortality, improved vigour and strength of the animals, and extended time out of water. Such improved performance could allow shipments to reach additional and/or more distant markets and use alternative, more cost-effective freight routings, and potentially provide new short-term storage options without requiring water tanks. Venting as disclosed herein could also or instead potentially allow for crustacean species that have historically been unsuccessfully shipped by air freight to now be shipped into lucrative markets that were previously unreachable.

The inventor has discovered that vents located in the lid of an insulated container do not vent enough $CO_2$ from the container to significantly affect shellfish mortality during shipping. $CO_2$ is heavier than air, and therefore tends to fall towards the bottom of the container. As such, the inventor has proposed and experimentally confirmed that vents should be located toward the bottom of a container in order to better vent $CO_2$.

Locating vents in walls of an insulated container, toward the bottom of the insulated container, is counter-intuitive to conventional wisdom. Such vents would appear to defeat the purpose of an insulated container by allowing colder air to vent to outside. The inventor has recognized potential benefits of allowing $CO_2$, which is heavier than air, to vent from an insulated container, and the potential benefits outweigh the compromise of some insulation loss. Various factors impact vent location, as disclosed herein, and venting represents a significant advance in the field of live shellfish storage.

Figure 6:
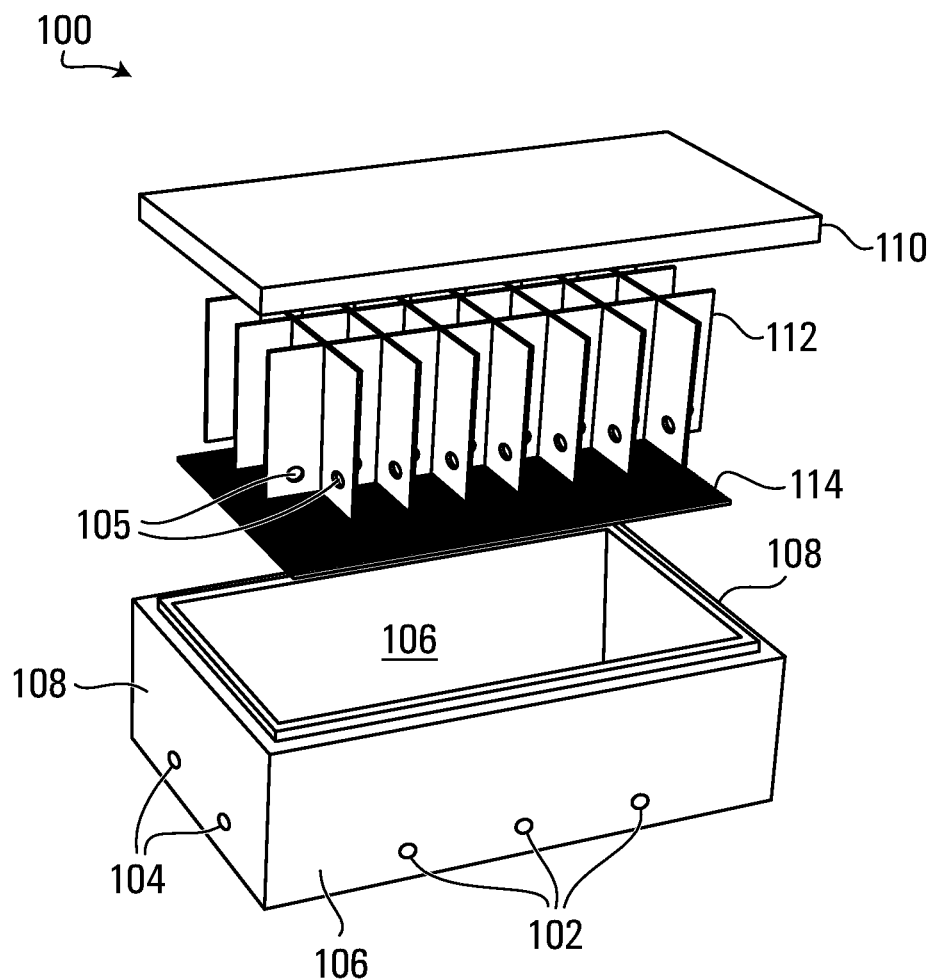
FIG. 6 is an exploded view illustrating an example container according to an embodiment.
Figure 7:
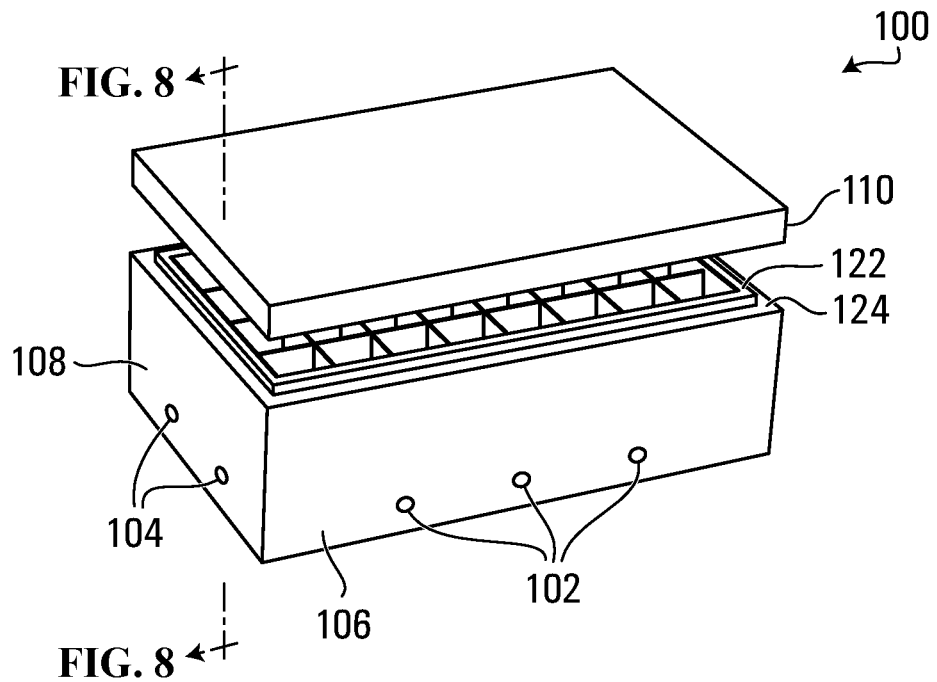
FIGS. 7 and 8 are diagrams illustrating how container sides and a container lid mate together in an embodiment.
Figure 8:
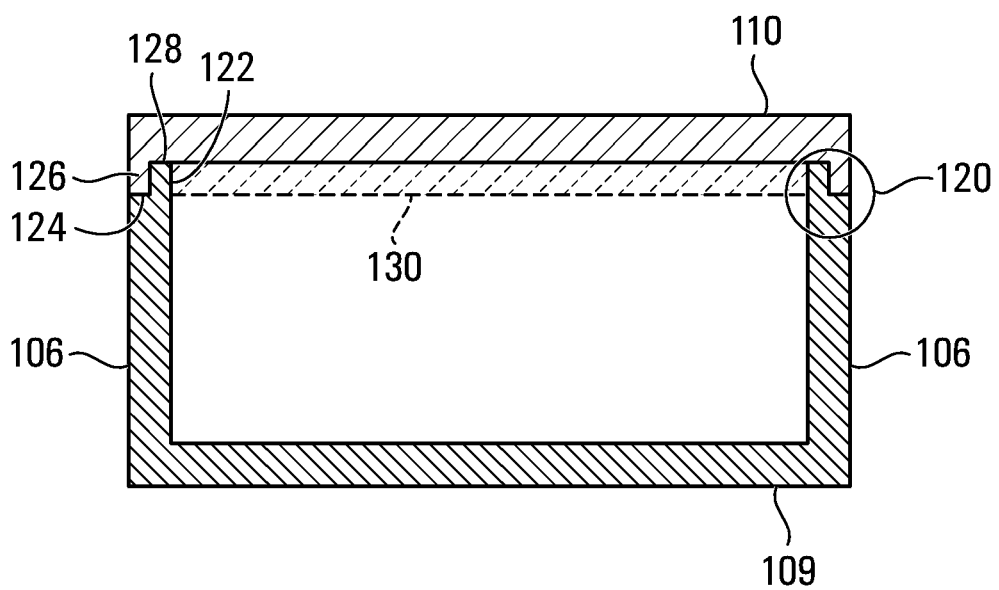

FIG. 6 is an exploded view illustrating an example container according to an embodiment, and FIGS. 7 and 8 are diagrams illustrating how container sides and a container lid mate together in an embodiment. The view in FIG. 8 is a cross-sectional view along lines 8-8 in FIG. 7. Various features of the example container 100 are described herein with reference to FIGS. 6 to 8.

The example container 100 is an insulated container, and includes a bottom 109, sides 106, 108, and a lid 110. In the embodiment shown, the lid 110 is separate from the bottom 109 and sides 106, 108, and the bottom and sides are integrated as shown in FIG. 8. In other embodiments, container components could be structured in a different way. Bottom, side, and/or lid panels could be manufactured separately and joined together by fasteners, adhesive, friction fit, complementary structures, and/or other means, for instance.

One example is shown for the lid 110, such as at 120 in FIG. 8. The container walls 106 and/or 108 have an extension or lip 122 and the lid 110 has a complementary extension or lip 126. In an embodiment, the extension or lip 126 could partially define a groove in the lid 110. This is shown as an optional feature in FIG. 8 by the dashed line at 130. The extensions or lips 122, 126 engage each other, and also engage a complementary shelf 124, 128 to releasably attach or fasten the lid 110 to the sides 106, 108. The sides 106, 108 could be similarly attached or fastened to the bottom 109 in another embodiment.

The lid 110 could include holes, as in industry standard shipping boxes, but in other embodiments the lid 110 has no holes. In accordance with embodiments disclosed herein, the sides 106, 108 include at least one ventilated wall that includes one or more vents. The example container 100 includes multiple ventilated walls 106, 108, with vents in the form of ventilation openings 102, 104. Any or all of the walls 106, 108 could be ventilated.

The container 100 is an insulated container. The bottom 109, sides 106, 108, and lid 110 are made from, or at least include, an insulating material. For example, these parts of the example container 100 could be made from expanded polystyrene, corrugated cardboard or plastic that may or may not include heat reflective films to improve temperature stability, or rotationally moulded or thermoformed plastics such as used in traditional picnic-type coolers. It is expected that the bottom 109, sides 106, 108, and lid 110 would be made from the same material and manufacturing method, but different materials and/or manufacturing methods could be used for different parts.

Other components could also be used in some embodiments. For example, FIG. 6 illustrates a divider 112, which could be made from corrugated plastic or another material suitable for dividing the interior space of the container 100 into compartments. Corrugated plastic is suitable for this purpose due to its waterproof and insulating qualities. The divider 112 could be made from the same material as other container components such as the bottom 109, sides 106, 108, and lid 110, or from a different material.

A bottom insert 114 is also shown in FIG. 6, as another example of a component that could be provided in some embodiments. The bottom insert 114 could be used to aid in venting and/or for other purposes as disclosed herein, and could be made from the same material as other box components or from a different material. The bottom insert 114 could also be absorptive and aid in retaining the dripping water from the packaged animals. This could allow for lower placement of the $CO_2$ ventilation openings for example.

In general, some embodiments related to an insulated container that includes a bottom such as 109 and walls 106, 108 that define an interior space to accommodate live shellfish. The walls include at least one ventilated wall having a vent at a location toward the bottom. In the example shown in FIG. 6, a vent includes multiple ventilation openings 102, 104 formed in a wall 106, 108. The walls include end walls 108 and side walls 106, and one or more end walls, one or more side walls, or both, could be a ventilated wall. Each of multiple ventilated walls could have a respective vent.

A ventilated wall could include one or move vents. The multiple ventilation openings 102, 104 could each be considered a vent, or alternatively the ventilation openings 102 in the wall 106 could be considered one vent, and the ventilation openings 104 in the wall 108 could be considered another vent. Other vent structures, with more or fewer openings having a similar or different shape than shown in FIG. 6 are also contemplated. Vents could include one or more elongated slots, for example. Ventilation openings in the form of holes could be more easily formed, by drilling for example, but embodiments are not in any way limited to any number or form of vents.

Figure 13:
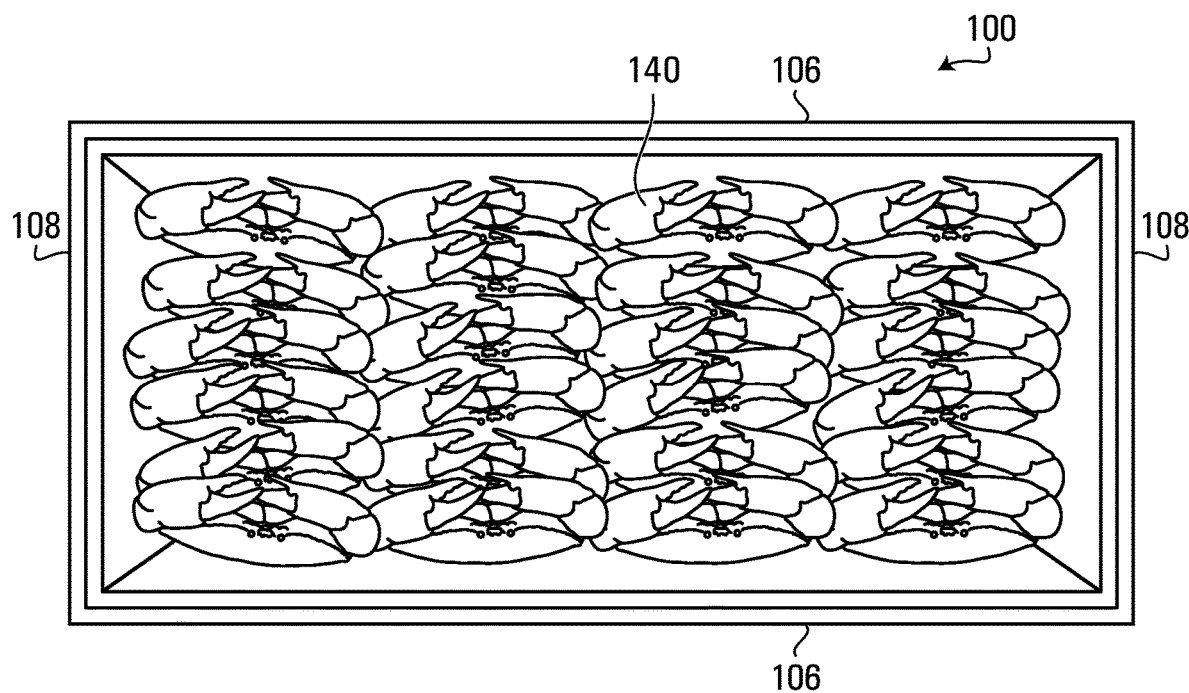
FIG. 13 is a diagram illustrating an example container packed with crabs.

The vent location(s) could be determined based on any of various factors. For example, vent location(s) could be at or below an expected height of gills of the live shellfish relative to the bottom 109 of the insulated container. The expected height could be based on the live shellfish being oriented in a vertical orientation substantially perpendicular to the bottom 109, as shown in FIG. 13, which is a diagram illustrating an example container packed with crabs 140. Crabs could also or instead be oriented in a horizontal orientation substantially parallel to the bottom of the insulated container, and the expected height could then be based on gill height in the horizontal orientation. For vertical and horizontal orientations, expected gill heights may vary, for example, depending on crab size and/or species. By way of example, expected height to the gills for vertically-packed *Cancer pagurus* would range from approximately 1 to 5 cm from the inside bottom of the box to the lowest part of the gills and approximately 7 to 12 cm at the highest part of the gills depending on the size of the crab. Horizontally-packed *C. pagurus* height to gills could range from approximately 1 to 3 cm at the lowest part of the gills and approximately 5 to 7 cm at the highest part of the gills depending on the size.

Vent location(s) could also or instead be based on avoiding or reducing water leakage. A certain amount of water will drain from live shellfish during storage, and it may be generally desirable to avoid leakage during air transport, for example. The location of the vent(s) could be at or above an expected height of a liquid level inside the insulated container relative to the bottom of the insulated container. Vent location(s) could be determined based on allowing a maximum level of liquid inside a container and/or allowing a certain degree of tipping or other movement of a container before an expected liquid level would reach the vent(s). In some embodiments, a tray or other collection device is provided underneath an insulated container in order to collect any water that leaks through ventilation openings in the container.

The height of the vent(s) on walls of a container could be specified relative to an interior surface of the bottom 109 of the insulated container, relative to an exterior surface of the bottom of the insulated container, or even from a top of the insulated container.

Vent location(s) could be different for different sizes of live shellfish, different species and/or different packing densities within different size boxes. An insulated container for crabs, for example, could be a standard size for 15 kg shipping weight, with dimensions L800×W400×H245 mm (external). An insulated container for the lobster *H. americanus*, for example, could be a standard size for 15 to 20 kg shipping weight, with dimensions L610×W405×H317 mm (external). For crabs, vent height could be in the range of 1 to 5 cm and for lobsters, vent height could be in the range of 1 to 12 cm. Other container dimensions and/or vent location(s) are possible.

Vents in the form of holes of approximately 7 mm diameter were used in trials disclosed above. Experimentation has also been conducted by the inventor using from 1-4 holes. Characteristics such as vent size(s), the total number of vents, and/or the number of ventilated walls could be different in different embodiments. Two trial vent patterns (1 or 2 per box end wall) are disclosed by way of example above, and may be suitable for at least some storage conditions. Ventilation characteristics could be determined based on such factors as species, size, and/or number of animals per box. One hole of approximately 7 mm diameter in a 15 kg lobster box shows reduced $CO_2$ accumulation versus standard non-vented boxes, but the stable level of $CO_2$ in such a vented box is slightly elevated compared to vented boxes with 2 or more holes of the same approximate size. Vent size(s) and quantity (which affect total ventilation or vent opening surface area), and/or vent distribution on one or more container walls, could be determined per species and box packing density, for example. Ventilation characteristics could in general be related to the amount of $CO_2$ produced by a group of animals per cubic volume of box interior space.

An insulated container could include other components or features that are relevant for $CO_2$ venting. For example, the bottom of the insulated container could have one or more channels formed or otherwise provided therein. A pattern of channels could be machined or moulded into the container bottom. The vent(s) could then overlap, at least partially, with the channel(s) to aid in having $CO_2$ collect beneath the live shellfish and be ventilated outside the insulated container. This is shown by way of example in FIG. 9, which is a top view of an empty container, illustrating a pattern of channels 142 in the bottom of the box, with the ends of the channels aligned with the ventilation openings 102, 104 in the walls 106, 108. In some embodiments, such as the example illustrated in FIG. 9, the cross-section of the channels 142 is similar in size and shape to that of the ventilation openings 102, 104. However, in other embodiments, a cross-section of one or more channels could differ in size and/or shape from that of corresponding ventilation openings.

Figure 9:
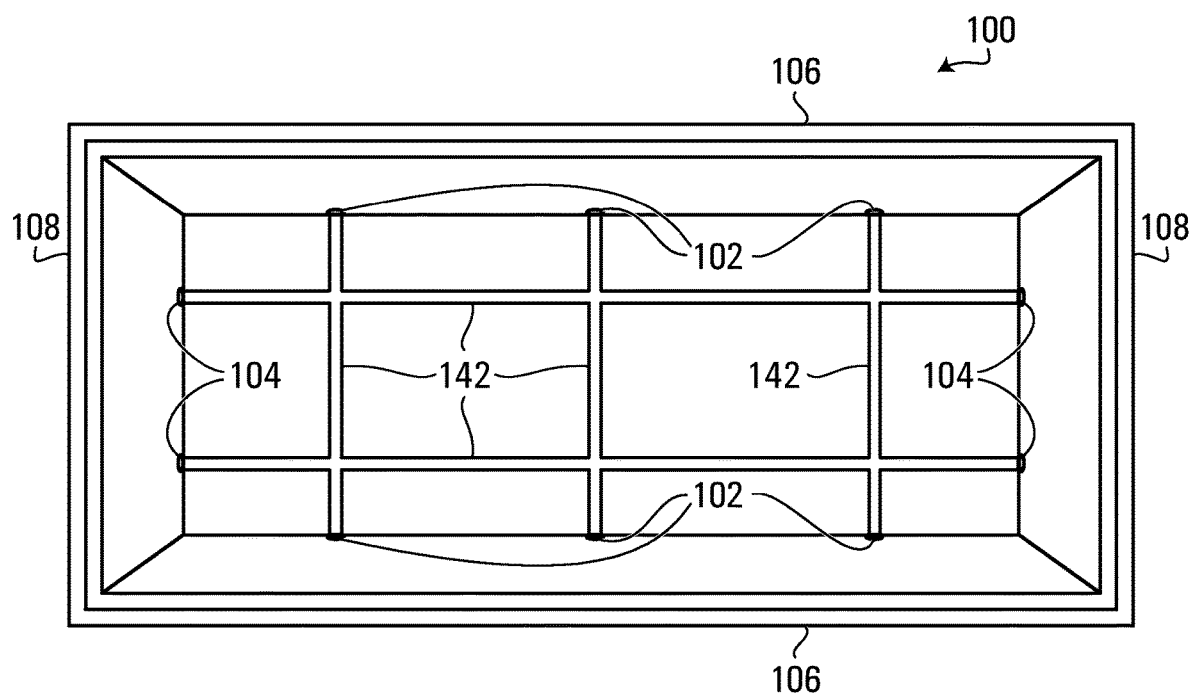
FIG. 9 is a top view of an empty container, illustrating a pattern of channels in the bottom of the container according to an embodiment.

Although FIG. 9 illustrates an example in which each of the ventilation openings 102, 104 is adjacent to the end of a corresponding channel 142, this might not be the case in all embodiments. For example, an insulated container could include some ventilation openings that are adjacent to the end of a corresponding channel, as well as other ventilation openings that are not adjacent to the end of a corresponding channel. Containers that have channels without corresponding ventilation openings are also contemplated.

The bottom insert 114 could also or instead be provided, and be configured to displace the live shellfish from the bottom of the insulated container to accommodate one or more fluids below the live shellfish (and below the vent location(s), and/or configured to direct one or more gases to the vent(s). For directing gas(es) to the vent(s), the bottom insert 114 could include one or more channels with which the vent(s) at least partially overlap. A pattern of channels as shown in FIG. 9 could be provided in a bottom insert 114, for example.

Another optional component is the divider 112, to divide the interior space of the insulated container into cells to accommodate the live shellfish in a vertical orientation substantially perpendicular to the bottom of the insulated container. A divider might be provided for lobster storage but not for crab storage, for example. Gas flow between cells could be facilitated by a divider that has fluid communication channels at the bottom, to enable fluid communication between adjacent cells of the plurality of cells.

Examples of fluid communication channels in a divider are shown at 105 in FIG. 6. The fluid communication channels 105 are illustrated as holes in the walls of the divider 112 to allow fluid flow between different cells of the divider. For example, $CO_2$ that is produced in a cell of the divider 112 that is not adjacent to one of the ventilation openings 102, 104 could flow through one or more of the fluid communication channels 105 to reach a ventilation opening.

Dividers without fluid communication channels are also contemplated. A divider without such channels could be used, for example, in conjunction with a bottom insert or container bottom that includes channels.

Figure 10:
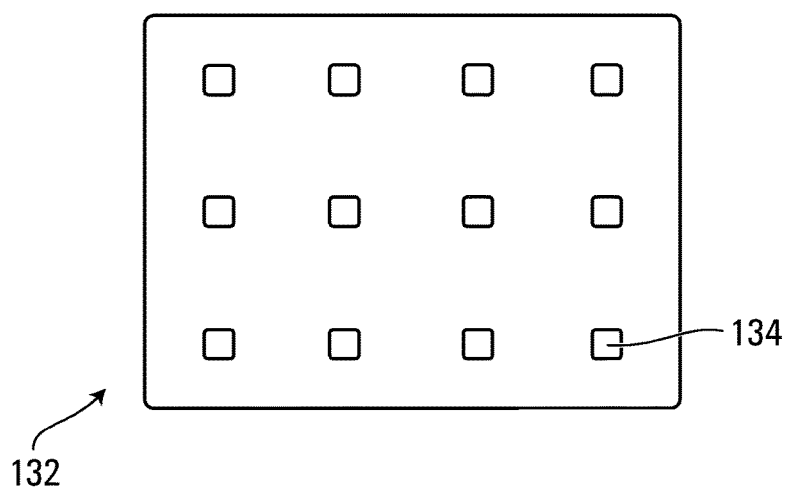
FIG. 10 is a top view of a top insert according to an embodiment.

The presence of a divider 112 could also impede fluid flow between cells toward the top of an insulated container. A perforated top insert or panel, with openings aligned with the cells, could be carried at or below a top edge of the insulated container by the divider, to distribute one or more fluids to the cells. Such a top insert could be made from the same material as the divider 112 or from a different material, and is perforated to act as a flow distribution plate for moisture and/or air above packed shellfish. FIG. 10 is a top view of a top insert according to an embodiment. A top insert 132 has perforations 134, and may be sized to fit inside the top edges of an insulated container. For example, the top insert 132 may be carried at or below the top edges of the insulated container when placed inside the container and on top of the divider 112. While not shown in FIG. 10, a top insert may have side walls, lips, folds, and/or other structural features, to help avoid fluid bypassing the perforations 134 and flowing along the outer edges of the divider 112 and the inner edges of the container.

Leakage of liquid from inside an insulated container could be reduced or avoided in some embodiments by properly determining vent location(s), as described above. A gas permeable and water-resistant structure could also or instead be provided adjacent to the (or each) vent, to form a water-resistant seal over the vent(s). Such a structure could be in the form of a membrane or other material, which could be fastened around, inside, and/or otherwise over a vent, on the inside or outside of an insulated container. Such fastening could be by adhesive or other means. In some embodiments, a frame could be used to hold a gas permeable and water-resistant material and fastened to an insulated container.

A gas permeable and water-resistant structure could be implemented, for example, using a gas diffusion membrane. A water-resistant or waterproof but gas permeable material could be preferred for the gas permeable structure(s), to provide for gas permeation without significantly impacting water and/or humidity containment, for example. A gas permeable membrane represents one example of a gas permeable structure.

Figure 11:
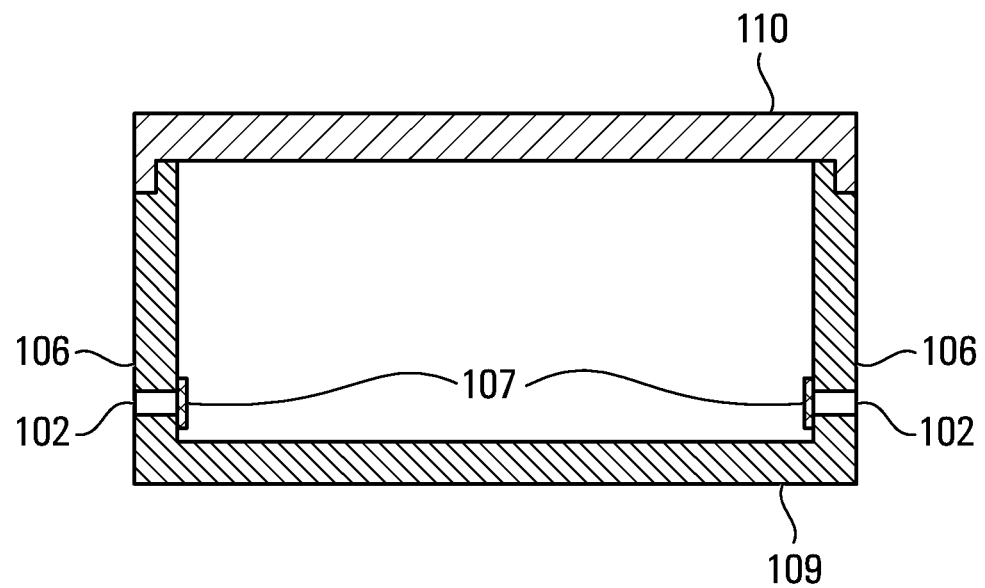
FIG. 11 is a cross-sectional view of a container according to another embodiment.

FIG. 11 is a cross-sectional view, similar to FIG. 8, of a container according to another embodiment. In the embodiment shown in FIG. 11, an insulated container includes a bottom 109, a lid 110 and walls 106. Walls 108 are not visible in FIG. 11, but are also provided to define an interior space of the container. The cross-section in FIG. 11 is taken such that it intersects two ventilation holes 102 in the walls 106. Each ventilation hole 102 is covered with a respective membrane 107. The membranes 107 are fastened to the inside surface of the walls 106 at a location that is adjacent to the ventilation holes 102. Membranes could also or instead be fastened to the outside surface of container walls. The membranes 107 are made from a water-resistant or waterproof but gas permeable material, and therefore the membranes resist or inhibit water from passing through the ventilation holes 102, while permitting the passage of gases.

Instead of or in addition to providing a gas permeable water-resistant seal for each vent, a gas permeable and water-resistant liner could be used inside the container, or animals could even be packed into a gas permeable and water-resistant bag. Such a liner or bag could also be useful in providing for gas flow while reducing or avoiding leakage of liquids through the vent(s).

The idea that $CO_2$ is the limiting factor for storage time of crustaceans out of water opens up other means and methods of $CO_2$ control within containers, instead of or in addition to ventilation. $CO_2$ scrubbing, for example, could be used as an addition or alternative to venting, such as adding activated carbon to the bottom of a container to adsorb $CO_2$ that accumulates in the bottom of the container. Other materials that could provide a similar function are strong base chemical such as lithium peroxide, lithium hydroxide or sodium hydroxide, although the benefits of $CO_2$ scrubbing with strong basic chemicals may be limited due to the strong exothermic reaction that could potentially heat up the inside of a container. Activated carbon impregnated or coated matt or plastic materials could be added to the bottom of a container, as a bottom insert 114 for example, to sequester $CO_2$ and provide a low $CO_2$ environment for the animals.

Potential benefits of $CO_2$ scrubbing materials in an insulated container for shellfish include, for example, helping cool the interior of the container. Before $CO_2$ scrubbing materials are added to an insulated container, they could be chilled to help maintain a cool environment during shipping. Another potential benefit of $CO_2$ scrubbing materials is providing additional insulation in a container for shellfish.

In another embodiment, channels could be formed or otherwise provided in the bottom of a container or a bottom insert. Such channels could accumulate $CO_2$ below the animals, and need not necessarily be ventilated.

$CO_2$ accumulation within part of a container could be implemented in other ways, such as with ventilation holes in the bottom of, or a bottom insert in, an animal section of a container that also contains bottom channels, or more generally a bottom plenum or cavity into which the vent holes open. The plenum could accumulate $CO_2$ from the animals and keep the environment in which the animals are being stored in a low $CO_2$ state. In such embodiments, the ventilated wall of the insulated container is actually an upper bottom wall or animal section bottom wall, and the interior space of the container is divided by that ventilated wall into an animal section and a lower section for accumulation of $CO_2$. A ventilated container therefore need not necessarily be ventilated to the outside of the container. Ventilation could also or instead be between different interior sections of the container.

Figure 12:
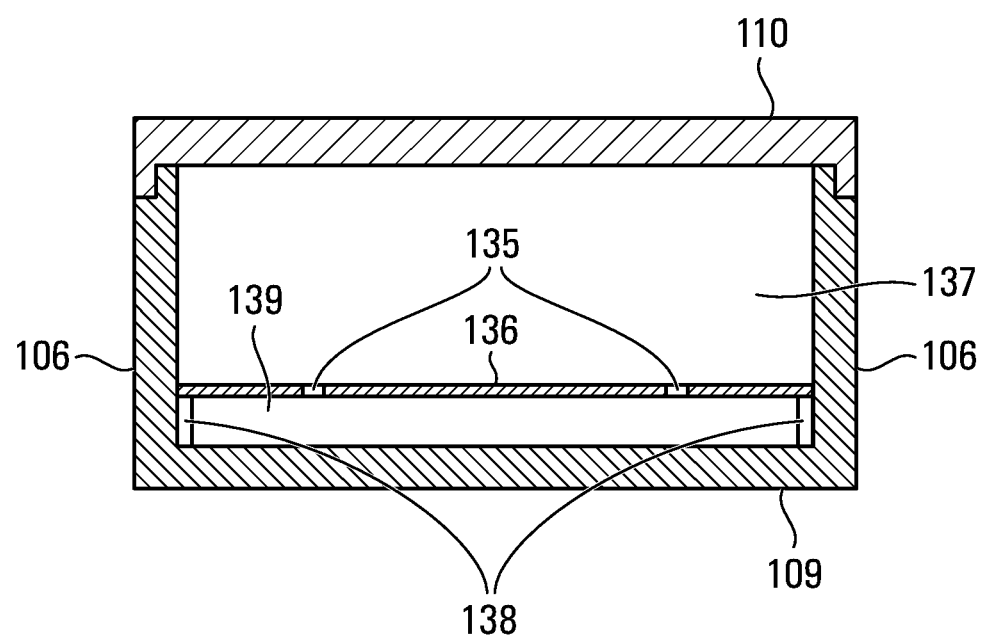
FIG. 12 is a cross-sectional view of a container according to a further embodiment.

FIG. 12 is a cross-sectional view, similar to FIGS. 8 and 11, of a container according to a further embodiment. In the embodiment shown in FIG. 12, an insulated container includes a bottom 109 and a lid 110, but the walls include not only walls 106 (which may or may not be ventilated in this embodiment) and adjacent adjoining walls 108 (see FIGS. 6 and 7, which may or may not be ventilated in the embodiment shown in FIG. 12), but also a ventilated wall 136, substantially parallel to the bottom, to divide the interior space into an animal section 137 to accommodate the live shellfish and a $CO_2$ accumulation section 139 to accumulate $CO_2$ that is released into the interior space by the live shellfish. The ventilated wall 136 includes multiple ventilation openings 135 to fluidly connect the animal section 137 to the $CO_2$ accumulation section 139. The ventilated wall 136 could be supported by one or more supports 138, which could be part of the walls 106 (and/or 108 not shown), the bottom 109, the ventilated wall itself, and/or separate components. Multiple different types of supports could be provided, including supports 138 adjacent to walls 106 (and/or 108) and supports that are located away from the walls toward the interior of the container, depending on how much weight the ventilated wall 136 is expected to support, for example.

The ventilated wall 136 and/or the supports 138 could be made from the same material(s) as one or more of the walls 106 (and/or 108), the bottom 109, and the lid 110, or from different material(s). In an embodiment that also includes $CO_2$ scrubbing, for example, it may be useful for the ventilated wall 136 to be an insulating wall, to reduce heat transfer from exothermic reactions in the section 139 to the animal section 137.

The walls 106 (and 108) and the bottom 109 define an interior space of the insulated container to accommodate live shellfish, and the ventilated wall further divides the interior space into sections 137, 139 as shown. The ventilated wall 136 is an example of a $CO_2$ handling feature to handle $CO_2$ that is released into the interior space by live shellfish. In this example, the $CO_2$ handling feature also includes the $CO_2$ accumulation section 139, in the form of a plenum or cavity into which the ventilated wall 136 ventilates the animal section 137.

Other embodiments of a $CO_2$ handling feature include, for example, $CO_2$ scrubbing, a vent in a wall 106 (and/or 108) at a location toward the bottom 109, and other forms of a $CO_2$ accumulation structure to accumulate $CO_2$ below the live shellfish (such as one or more channels or another structure in or on the bottom 109, and/or one or more channels or another structure in or on a bottom insert 114 in FIG. 1).

An insulated container could include multiple forms of $CO_2$ handling features, such as a ventilated wall 106 (and/or 108) in combination with one or more other features. Different embodiments of $CO_2$ handling or control could be combined, to provide $CO_2$ scrubbing in a plenum for longer term storage for example. An insulated container that includes one form of $CO_2$ handling feature could therefore also include other $CO_2$ handling features, and/or other container features, disclosed herein.

Gas permeable and water-resistant structures could be implemented to help trap water and/or humidity in the animal section 137. For example, fastening a gas permeable and water-resistant membrane over each of the ventilation openings 135, and/or packing the animals into a gas permeable and water-resistant bag, could resist or inhibit water from passing through the ventilation openings and into the $CO_2$ accumulation section 139.

The description of FIGS. 6 to 12 concentrates primarily on features of an insulated container. FIG. 13 is a diagram illustrating an example container packed with crabs, and as noted above shows an example of vertical orientation of crabs 140. Crabs could also or instead be packed horizontally. After crabs are packed into an insulated container, the lid 110 would be installed to close the interior space of the container.

Figure 14:
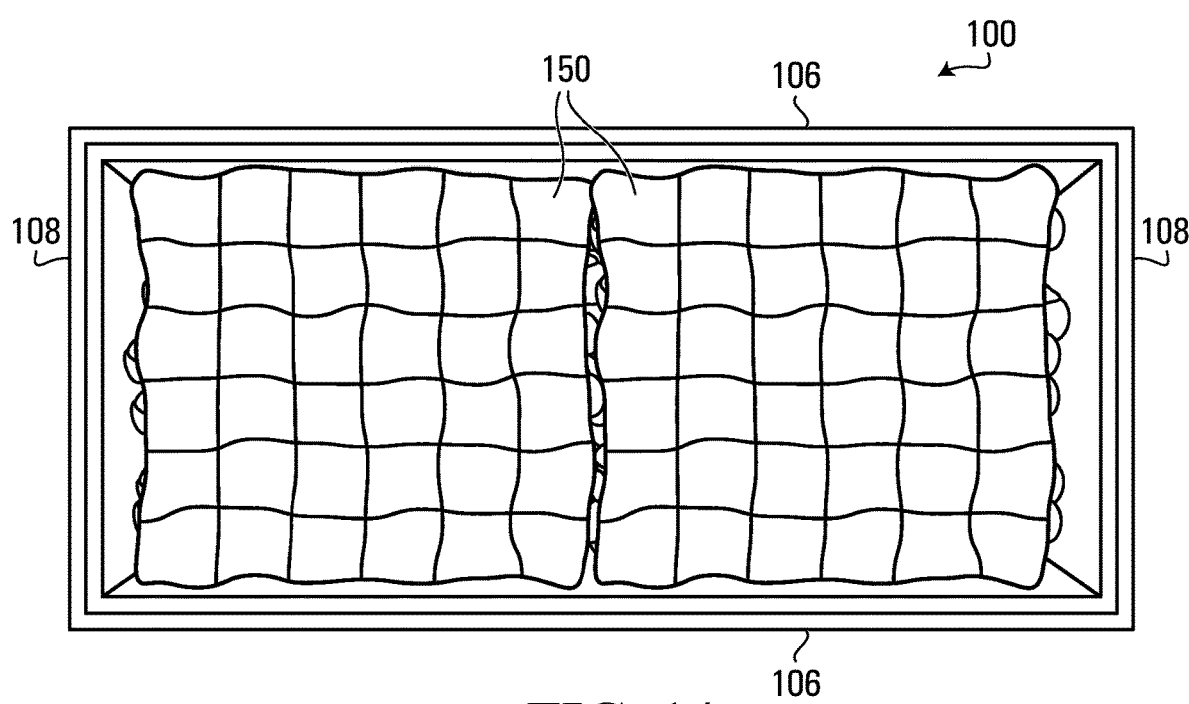
FIG. 14 is a diagram illustrating the example packed container in FIG. 13, with ice packs above the crabs.

Other components could also be installed before or during packing. For example, one or more absorbent pads could be placed on the bottom of an insulated container before live shellfish are packed, to reduce the amount of liquid in the container. Any one or more of a bottom insert 114, a divider 112, and a top insert 132 could also or instead be packed in a container. One or more moisture pads and/or ice packs could be packed above the live shellfish, on top of a divider 112 and/or a top insert 132 if provided. This is shown by way of example in FIG. 14, which is a diagram illustrating the example packed container in FIG. 13, with ice packs 150 above the crabs.

A package for storage or transport according to the present disclosure includes an insulated container as disclosed, and live shellfish inside the insulated container. A container or package could be used in a ventilated transport or storage system that includes a ventilated enclosure having an interior space to accommodate containers or packages, and containers or packages in the ventilated enclosure. The ventilated enclosure could be, for example, a refrigerated container, a cargo hold, a truck trailer, or an ocean-going vessel.

Figure 15:
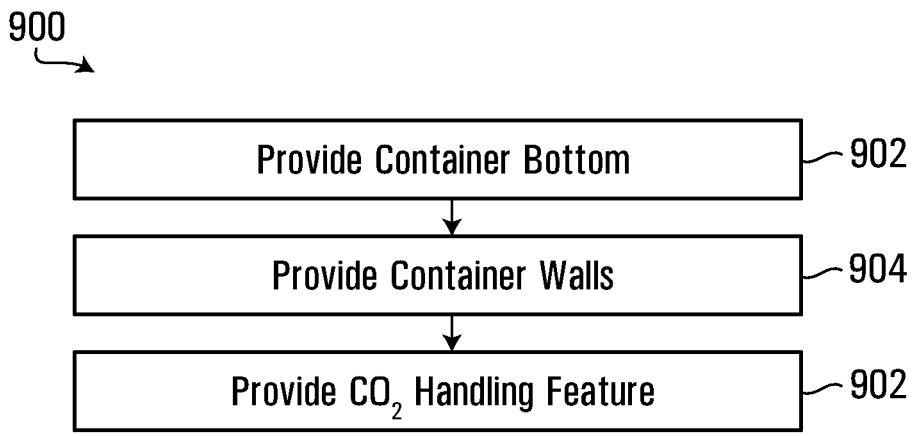
FIGS. 15-17 are flow charts illustrating example methods according to embodiments.

Embodiments of the present disclosure have been described above primarily in the context of example containers and product packages. Methods are also contemplated. For example, a method 900 as shown in the flow chart of FIG. 15 relates to manufacture of a container. The example method 900 involves providing various components, including a container bottom (at 902) and container walls (at 904) defining an interior space of an insulated container to accommodate live shellfish, and a $CO_2$ handling feature (at 906). Although shown as separate operations in FIG. 15, a $CO_2$ handling feature could be provided in one or more container walls at 904, by providing a ventilated wall having a vent at a location toward the bottom for example. Similarly, in some embodiment the bottom and walls could be provided together instead of in separate operations as illustrated at 902, 904. Other system components could also be provided in some embodiments.

Embodiments could include any one or more of the following features:
- providing a ventilated wall involves venting an unventilated wall (for example, by forming one or more vents in an unventilated wall—this could involve, for example, drilling or otherwise forming ventilation openings in a solid wall);
- the walls include end walls and side walls, and the ventilated wall includes one of the end walls (for example, 108 in FIGS. 6 and 7);
- the walls include end walls and side walls, and the ventilated wall includes one of the side walls (for example, 106 in FIGS. 6 and 7);
- the ventilated wall has multiple vents (for example, 102, 104 in FIGS. 6-7);
- each of the walls (for example, 106, 108 in FIGS. 6 and 7) has a respective vent (for example, 102, 104 in FIGS. 6 and 7);
- providing a gas permeable and water-resistant structure (for example, 107 in FIG. 11), adjacent to the vent, to form a water-resistant seal over the vent;
- the location of the vent in the ventilated wall is at or below an expected height of gills of the live shellfish relative to the bottom of the insulated container;
- the expected height of the gills of the live shellfish is based on the live shellfish being oriented in a vertical orientation substantially perpendicular to the bottom, as shown by way of example in FIG. 13;
- the expected height of the gills of the live shellfish is based on the live shellfish being oriented in a horizontal orientation substantially parallel to the bottom of the insulated container;
- the location of the vent in the ventilated wall is at or above an expected height of a liquid level inside the insulated container relative to the bottom of the insulated container;
- the location of the vent in the ventilated wall is at a height on the ventilated wall relative to an interior surface of the bottom of the insulated container;
- the location of the vent in the ventilated wall is at a height on the ventilated wall relative to an exterior surface of the bottom of the insulated container;
- providing a channel (for example, 142 in FIG. 9) in the bottom of the insulated container;
- the vent overlaps, at least partially, with the channel in the bottom of the insulated container, as shown by way of example in FIG. 9;

providing a divider (for example, 112 in FIG. 6) to divide the interior space of the insulated container into cells to accommodate the live shellfish in a vertical orientation substantially perpendicular to the bottom of the insulated container;

the divider has fluid communication channels (for example, 105 in FIG. 6) formed therein to enable fluid communication between adjacent cells;

providing a perforated top insert (for example, 132 in FIG. 10), to be carried at or below a top edge of the insulated container by the divider, to distribute one or more fluids to the cells;

providing a bottom insert (for example, 114 in FIG. 6);

the bottom insert is configured to displace the live shellfish from the bottom of the insulated container to accommodate one or more fluids below the live shellfish;

the bottom insert is configured to direct one or more gases to the vent; and providing a lid (for example, 110 in FIGS. 6-8) to close the interior space.

Providing a $CO_2$ handling feature to handle $CO_2$ that is released into the interior space by the live shellfish at 906 could include, for example, any one or more of the following:

providing $CO_2$ scrubbing by, for example, adding or otherwise incorporating a $CO_2$ scrubbing material into the interior space;

providing a vent in a wall, at a location toward the bottom;

providing a $CO_2$ accumulation structure to accumulate $CO_2$ below the live shellfish, as shown by way of example in FIG. 12;

the bottom includes the $CO_2$ accumulation structure;

providing a $CO_2$ accumulation structure involves providing a bottom insert that includes the $CO_2$ accumulation structure;

the $CO_2$ accumulation structure includes one or more channels;

providing a ventilated wall (for example, 136 in FIG. 12), substantially parallel to the bottom, to divide the interior space into an animal section (for example, 137 in FIG. 12) to accommodate the live shellfish and a $CO_2$ accumulation section (for example, 139 in FIG. 12) to accumulate $CO_2$ that is released into the interior space by the live shellfish;

the $CO_2$ accumulation section includes a plenum or cavity into which the ventilated wall ventilates the animal section; and other features as disclosed herein.

Figure 16:
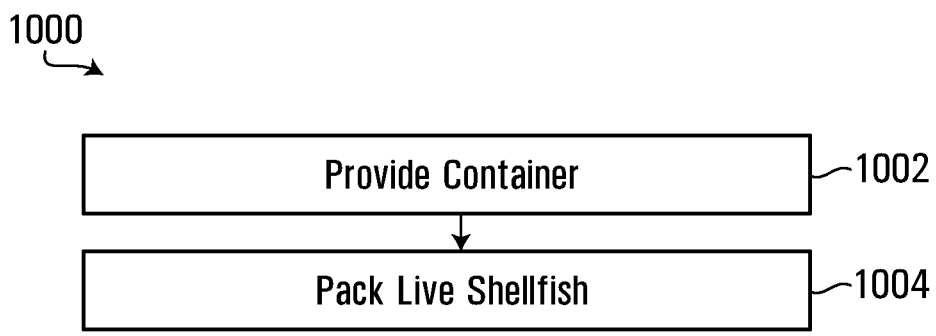

Another example method 1000 is shown in FIG. 16. This example method relates to using a container as disclosed herein, and includes a step 1002 of providing an insulated container. The container, in an embodiment, has a bottom and walls defining an interior space to accommodate live shellfish, and the walls include a ventilated wall having a vent at a location toward the bottom. In another embodiment, providing the insulated container at 1002 involves providing a bottom and walls defining an interior space of the insulated container to accommodate live shellfish, and providing a $CO_2$ handling feature to handle $CO_2$ that is released into the interior space by the live shellfish. The container, and/or the illustrated operation of providing the container at 1002, could include any one or more of other features as disclosed herein. The example method 1000 also includes packing live shellfish into the insulated container at 1004.

Figure 17:
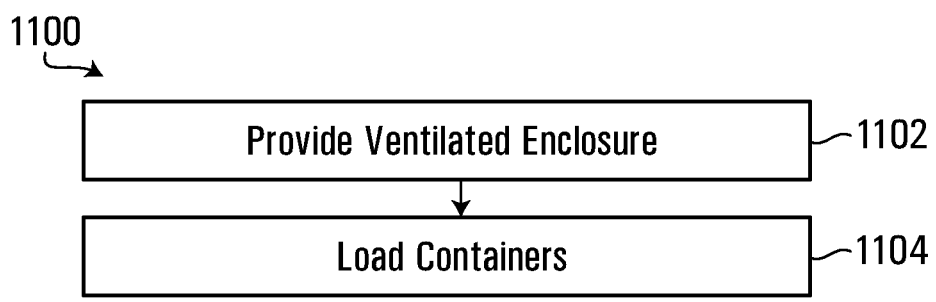

Another example method 1100 is shown in FIG. 17. This example method relates to transport or storage of insulated containers or packages as disclosed herein, and includes a step 1102 of providing a ventilated enclosure having an interior space to accommodate containers or packages, and a step 1104 of loading the ventilated enclosure with insulated containers or packages. In an embodiment, each insulated container includes a bottom and walls defining an interior space to accommodate live shellfish, and the walls include a ventilated wall having a vent at a location toward the bottom. In another embodiment, each insulated container includes a bottom and walls defining an interior space of the insulated container to accommodate live shellfish and a $CO_2$ handling feature to handle $CO_2$ that is released into the interior space by the live shellfish. Each insulated container could further include the live shellfish packed into the interior space, also referred to herein as a package. Any one or more of other features disclosed herein could be provided in each insulated container or package.

The example methods disclosed herein are intended solely for illustrative purposes. Other embodiments may include further fewer, and/or different operations performed in a similar or different order. For instance, the flow diagrams are not intended to imply that each operation is necessarily performed separately or in sequence. Container components such as a bottom and walls could be moulded or otherwise formed together, for instance, to simultaneously provide those components. These and/or other components could be provided separately, and possibly by separate entities.

It should also be noted that the provision of components need not necessarily involve manufacturing those components. For example, components could be sourced from a manufacturer and need not necessarily be manufactured by the same entity that actually packs the containers with shellfish and/or loads the containers for shipping or otherwise for storage, as disclosed herein. Component manufacturing and/or assembly could thus be performed by separate entities, in which case a manufacturer "provides" system components by manufacturing them, and a packer, storer, or shipper "provides" containers or components by purchasing them, from a manufacturer or distributor for example.

Embodiments of the present disclosure may allow live crabs, lobsters and/or other shellfish to be maintained out of water for an extended period of time, during storage and/or shipping. Savings in physical space requirements, weight, and water usage could also be realized, in that insulated and ventilated containers could be used at least for short-term storage, as an alternative to immersed storage. Embodiments might also improve storage mortality performance.

What has been described is merely illustrative of the application of principles of embodiments of the invention. Other arrangements and methods can be implemented by those skilled in the art without departing from the scope of the present invention.

For example, the drawings are intended solely for illustrative purposes. Other embodiments might include further, fewer, or additional features, arranged in a similar or different manner than shown.

The invention claimed is:

1. An insulated container packed with live crustaceans for storage, comprising:

a bottom, a plurality of walls, and a lid wherein the bottom, the plurality of walls, and the lid comprise an insulating material and define an interior space; and the live crustaceans packed in the interior space in a vertical orientation substantially perpendicular to the bottom, the plurality of walls comprising at least one ventilated wall having a plurality of carbon dioxide ($CO_2$) ventilation openings at a height on the at least one ventilated wall above an interior surface of the bottom, and wherein the height on the at least one ventilated wall of each of the plurality of $CO_2$ ventilation openings is between 1 cm and 5 cm above the interior surface of the bottom and the height of each of the plurality of $CO_2$ ventilation openings is selected to align at or be below a lowest part of gills of the live crustaceans packed in the interior space, wherein the plurality of $CO_2$ ventilation openings remain in an open configuration and are the only openings in the insulated container when the insulated container is in a closed configuration with the lid contacting the plurality of walls, wherein each of the plurality of $CO_2$ ventilation openings has a diameter that is approximated 7 millimeters, and wherein the plurality of $CO_2$ ventilation openings allow $CO_2$ produced by the live crustaceans to escape the insulated container and avoid leakage of water from the interior space of the insulated container that is packed with the live crustaceans.

2. The insulated container of claim 1, further comprising:
a gas permeable and water-resistant structure, adjacent each of the plurality of $CO_2$ ventilation openings, to form a water-resistant seal over each of the plurality of $CO_2$ ventilation openings,
the gas permeable and water-resistant structure comprising a gas permeable and water-resistant material.

3. The insulated container of claim 1, further comprising an absorptive bottom insert to aid in retaining the water that drips from the live crustaceans.

4. The insulated container of claim 1, wherein the at least one ventilated wall comprises a $CO_2$ handling feature to handle the $CO_2$ that is produced by the live crustaceans and released into the interior space by the live crustaceans.

5. The insulated container of claim 1, wherein the bottom comprises a channel provided therein, wherein the plurality of $CO_2$ ventilation openings align, at least partially, with the channel.

6. An insulated container for live crustaceans, comprising:
a bottom, a plurality of walls, and a lid each comprising an insulating material and together defining an interior space to accommodate the live crustaceans in a vertical orientation substantially perpendicular to the bottom, the plurality of walls comprising at least one ventilated wall having a plurality of carbon dioxide ($CO_2$) ventilation openings at a height on the at least one ventilated wall between 1 cm and 5 cm above an interior surface of the bottom, and wherein the height of each of the plurality of $CO_2$ ventilation openings on at least one ventilation wall is configured to be selected to align at or be below a lowest part of gills of the live crustaceans when housed in the insulated container and each of the plurality of $CO_2$ ventilation openings is further configured to allow $CO_2$ produced by the live crustaceans to escape the insulated container while avoiding leakage of water that drains from the live crustaceans when housed in the insulated container; and wherein each of the plurality of $CO_2$ ventilation openings is further configured to have a diameter that is approximately 7 millimeters, and the plurality of $CO_2$ ventilation openings are the only openings in the insulated container and remain in an open state when the insulated container is in a closed configuration with the lid positioned on a top of the insulation container.

7. The insulated container of claim 6, further comprising:
a gas permeable and water-resistant structure, adjacent to each of the plurality of $CO_2$ ventilation openings, to form a water-resistant seal over each of the plurality of $CO_2$ ventilation openings,
the gas permeable and water-resistant structure comprising a gas permeable and water-resistant material.

8. The insulated container of claim 6, further comprising an absorptive bottom insert to aid in retaining the water that drips from the live crustaceans.

9. The insulated container of claim 6, wherein the at least one ventilated wall comprises a $CO_2$ handling feature to handle the $CO_2$ that is produced by the live crustaceans and released into the interior space by the live crustaceans.

10. The insulated container of claim 6, wherein the bottom comprises a channel provided therein, wherein the plurality of $CO_2$ ventilation opening align, at least partially, with the channel.

* * * * *

UNITED STATES PATENT AND TRADEMARK OFFICE
CERTIFICATE OF CORRECTION

PATENT NO. : 12,274,246 B2  
APPLICATION NO. : 15/734632  
DATED : April 15, 2025  
INVENTOR(S) : John J. Garland Page 1 of 1

It is certified that error appears in the above-identified patent and that said Letters Patent is hereby corrected as shown below:

In the Claims

Column 19, Line 17, Claim 1, should read:
"tion openings has a diameter that is approximately 7"

Column 20, Line 8, Claim 6, should read:
"ventilation openings on at least one ventilated wall"

Column 20, Lines 26, Claim 6, should read:
"lated container"

Signed and Sealed this  
Twenty-fourth Day of June, 2025

Coke Morgan Stewart  
*Acting Director of the United States Patent and Trademark Office*